United States Patent [19]
Tyson

[11] 3,961,641
[45] June 8, 1976

[54] LIQUID SEAL FOR PREVENTING PNEUMATIC BACK FLOW

[75] Inventor: Thomas L. Tyson, Richmond, Va.
[73] Assignee: Texaco Inc., New York, N.Y.
[22] Filed: June 20, 1975
[21] Appl. No.: 588,929

[52] U.S. Cl. ............................... 137/209; 137/253; 137/344; 220/88 B; 137/565
[51] Int. Cl.² ........................................... F04F 1/00
[58] Field of Search ............... 114/74 R; 220/88 B; 137/209, 253, 344, 565

[56] References Cited
UNITED STATES PATENTS

| | | | |
|---|---|---|---|
| 1,671,492 | 5/1928 | Skinner | 220/88 B |
| 2,365,624 | 12/1944 | Cantello | 137/209 |
| 2,508,762 | 5/1950 | Lapple | 137/209 |
| 2,721,065 | 10/1955 | Ingram | 137/253 X |
| 3,285,711 | 11/1966 | Stanford | 220/88 B X |

Primary Examiner—Harold W. Weakley
Attorney, Agent, or Firm—T. H. Whaley; C. G. Ries; Henry C. Dearborn

[57] ABSTRACT

A liquid seal for use with low pressure gas lines. It has a U-shaped conduit and an associated reservoir with the sealing liquid therein connected to the bottom of the U. The reservoir has an overflow to maintain a desired level in the U-conduit under static conditions. The top of the reservoir is closed and is connected by a pneumatic line to a valve so that it may be connected alternatively to the down stream side of the gas seal or to the suction side of the pump which circulates the gas in the line.

11 Claims, 5 Drawing Figures

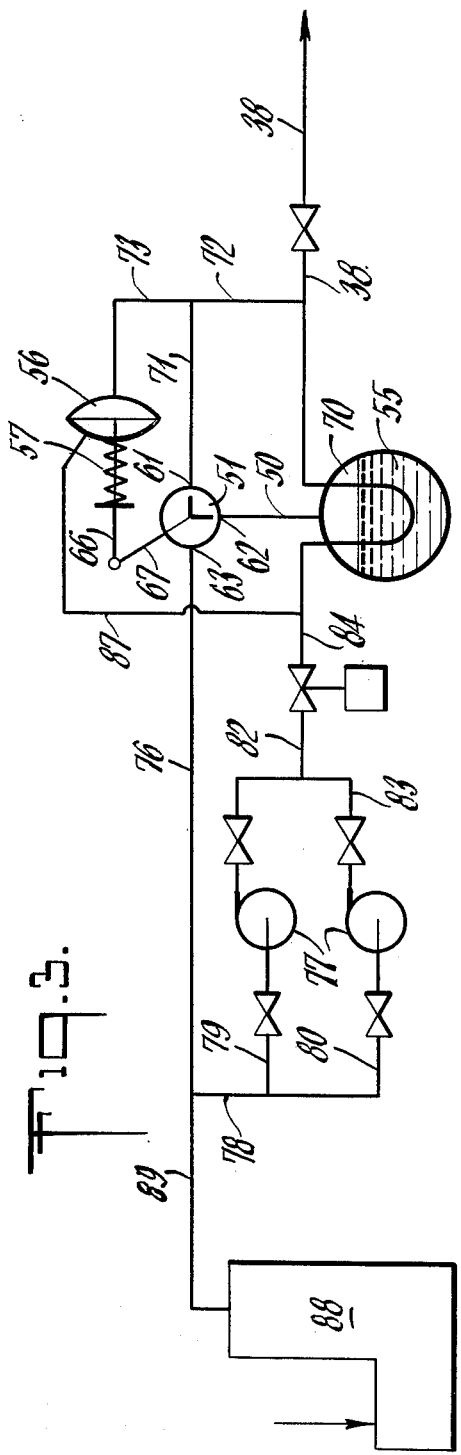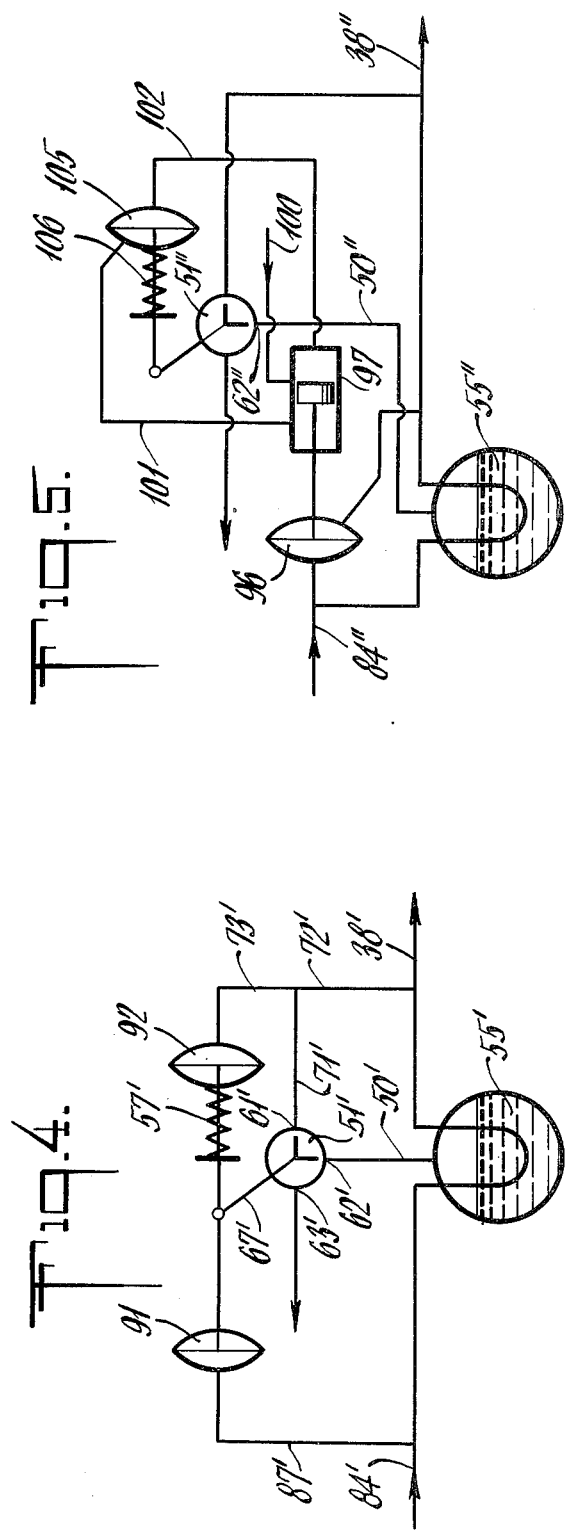

LIQUID SEAL FOR PREVENTING PNEUMATIC BACK FLOW

BACKGROUND OF THE INVENTION

1. Field of the Invention

This invention concerns a liquid type of gas seal, in general. More specifically, it concerns an improved gas-seal type of check valve that is particularly useful in connection with a gas inerting system, such as one used on petroleum cargo tank ships and the like. The invention is an improvement upon a U-tube type of liquid seal that is known and that has operational problems.

2. Description of the Prior Art

In low pressure gas inerting systems, and particularity such systems applicable to petroleum cargo tank operations, it has been found that mechanical non-return valves are unsatisfactory because they could not seal "gas tight" at the pressures encountered. While liquid (usually water) seals are frequently used as positive non-return devices which operate like a common liquid trap, there has been difficulty with a method employed to positively prevent back flow while permitting free gas flow in the forward direction.

Specifically, there is a known deck seal designed by Howden Engineering Limited that employs a device which allows water to fill a U-trap from a reservoir. The ullage space of the reservoir is connected to the throat of a venturi that is placed in the inert gas delivery line. The object of that arrangement is to create a suction in the ullage space which will remove the sealing water from the U-tube whereupon the seal will operate "dry" so as to prevent the carry-over of sealing water into the cargo tank or tanks. Of course, any such carry-over of water is detrimental because of corrosion, as well as blocking of the inert gas mains in the system.

However, experience with the Howden type seal has indicated that it does not operate as intended. In the first place the venturi is not able to act, i.e., apply suction, without inert gas flow. And, such gas flow can not occur until the bottom of the U-tube has cleared. Furthermore, the necessary degree of suction is not created by the venturi at relatively low gas flow rates. Consequently, before sufficient flow rate has been reached there will be substantial carry-over of the liquid from the seal. It has been found that a Howden type of equipment will have substantial carry-over of the liquid persist up to 86% of system capacity.

Consequently, it is an object of this invention to provide an improvement over a Howden type of seal. The improvement creates suction on the liquid of the seal from the input of the pump or fan that causes inert gas flow in the system. Consequently, the liquid carry-over is substantially eliminated.

Another object of the invention concerns the use of a fail-safe arrangement. It ensures the connection of the space above the reservoir liquid to the down stream side of the U-tube seal under failure conditions. Consequently, it is effective to block any backward flow of gas and thus eliminates danger of any explosive gas backing into the inert gas source, where the environment includes possible explosive conditions as caused by high temperatures and the like.

SUMMARY OF THE INVENTION

Briefly, the invention concerns a liquid seal for preventing back flow in a gas line having a pump associated therewith for circulating said gas. The seal comprises in combination a U-shaped conduit adapted for connection to the inlet of said gas line, and a reservoir for holding a supply of said sealing liquid and having an overflow located at a predetermined level above the bottom of said U-shaped conduit. It also comprises a liquid flow passage connecting the bottom of said U-shaped conduit with said reservoir. The said reservoir has a closed top with means for connecting the ullage space to a valve means for alternatively connecting said ullage space to the inlet of said gas line or to suction of said circulating pump.

Again briefly, the invention concerns a liquid seal for preventing back flow in a low pressure gas line having a pump associated therewith for circulating said gas. It comprises in combination a U-shaped conduit having a inlet leg and outlet leg adapted for connection to the inlet of said gas line. The said inlet leg has a height that is sufficient to create a safe sealing liquid back pressure against said gas back flow. The seal also comprises a reservoir for holding a supply of said sealing liquid and having an overflow located at a predetermined level above the bottom of said U-shaped conduit, and a liquid flow passage connecting the bottom of said U-shaped conduit with said reservoir. The said reservoir has a closed top forming an ullage space above said liquid in said reservoir. It also comprises two position three-way valve means having three ports, and first pneumatic conduit means for connecting said ullage space to one of said ports. It also comprises second pneumatic conduit means for connecting another of said ports to said gas line inlet, and third pneumatic conduit means for connecting the third one of said ports to the suction side of said pump. It also comprises a diaphragm type actuator for actuating said two position valve means, and spring bias means for biasing said two position valve into the position for connecting said ullage space to said gas line inlet.

Once more briefly, the invention concerns a liquid seal for use on petroleum cargo tankers and the like, having a blower for filling empty cargo tank space with an inert gas. The said liquid seal comprises in combination a U-shaped conduit having an inlet leg tall enough to insure adequate back pressure sealing against reverse flow from said cargo tank space, and a closed reservoir for holding the supply of said liquid and having an overflow located at a predetermined level above the bottom of said U-shaped conduit. It also comprises a liquid flow passage connecting the bottom of said U-shaped conduit with said reservoir, and pneumatically actuated valve means for alternatively connecting the top of said closed reservoir to said inlet leg or to the suction side of said blower. It also comprises means for actuating said valve means by pressure from the output side of said blower, and means for biasing said valve means to connect said reservoir top to said inlet leg in the absence of said blower pressure.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 3 is a schematic flow type diagram of the pneumatic system employed in accordance with the invention, including a schematic symbol to represent the elements of the liquid seal that are illustrated in FIG. 2;

FIG. 4 is a partial flow type diagram like that shown in FIG. 3 but illustrating a modification thereof; and FIG. 5 is another partial flow type diagram illustrating a portion of the pneumatic system but showing yet another embodiment according to the invention.

DESCRIPTION OF THE PREFERRED EMBODIMENTS

In low pressure gas flow systems such as the currently employed gas inerting arrangements that are used on petroleum product tank ships, it has been found impractical to employ any conventional mechanical type of check valve. This is because the seal created by such valves for avoiding back flow, is subject to leakage by reason of wear of the parts and passage of low pressure gas through the back flow check structure or around the mechanical seals. Consequently, attempts have been made to apply a liquid trap structure for creating an effective seal against back flow of the inerting gas, in piping or connections to the product tanks. However, prior known structures of this type have had a difficulty that involved the carrying over of liquid from the liquid trap into the product tank or piping. That tended to cause corrosion as well as create blockage in gas mains employed.

It may be noted that the liquid seal type of backflow preventer is the only practical arrangement that is completely effective for the conditions described. This is because it is of the utmost importance to prevent any back flow since the systems employed for applying inerting gas to the space above petroleum product tanks, when they are less than completely full, employ combustion product gases that are obtained from the stack gases in the engine room boiler on a tanker. Thus, any back flow of combustible vapors would create an explosive condition or produce a flash back from the high temperatures of the stack gases to the explosive atmosphere of the vapors in the cargo tank or tanks.

Figure 1:
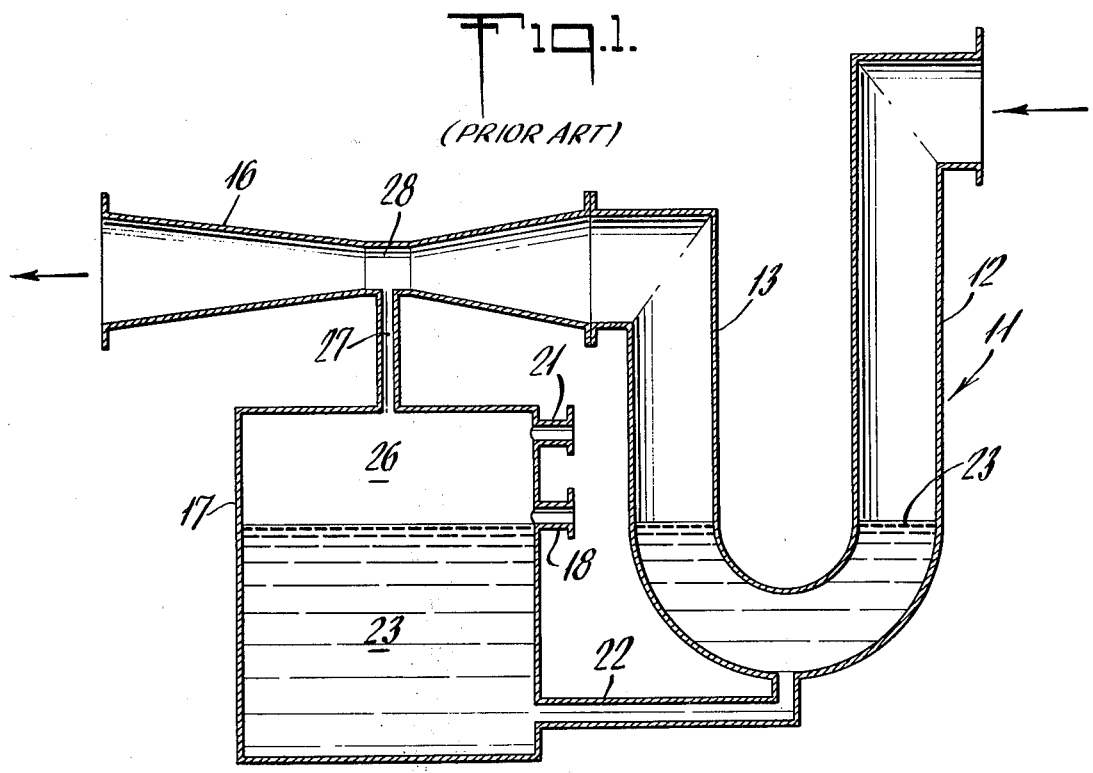
FIG. 1 is a schematic diagram illustrating structure according to the prior art.

As indicated above, one prior attempt to design a liquid seal for the indicated tanker use is a deck seal known as a Howden deck seal which employs a liquid type seal that has structure like that illustrated in the FIG. 1 showing of such prior art. Thus, it employs a U-shaped conduit 11 which has an inlet leg 12 that is taller than an outlet leg 13. The unit has a venturi 16 that is connected to the outlet leg 13. Also, there is a reservoir 17 that has an overflow outlet 18 at a predetermined level above the bottom of the U-shaped conduit 11. There is also a makeup-liquid connector 21 that provides for re-introducing or adding liquid whenever it has been reduced in quantity below the overflow 18.

There is a liquid flow passage 22 that connects the bottom of the U-tube 11 with the inside of the reservoir 17 near the bottom thereof, for making liquid flow interchange therebetween. Under static conditions, a quantity of liquid 23 fills both the reservoir 17 and the bottom of the U-tube 11 to the same height by reason of liquid passage connection 22.

The reservoir 17 has a closed top, as illustrated, so that an ullage space 26 contains gas from the system that is located above the liquid 23. Also, there is a pneumatic passageway 27 that connects the ullage space 26 with a throat 28 of the venturi 16.

The intended operation of this prior art structure was to have the reduced pneumatic pressure created at the throat 28, applied via the passageway 27 to the ullage space 26 of the reservoir 17. This would cause suction and thus carry some of the liquid 23 out through the overflow 18 and reduce the level of the liquid in the bottom of the U-tube 11. It was intended that this suction or reduced pressure act to draw down the liquid 23 in the bottom of the U-tube 11, so as to open the passage way through the U-tube and thus permit flow of gas in the forward direction. However, it will be noted (and it was recognized) that the Howden seal could not be effective in that manner under static conditions. Consequently, there was always a substantial quantity of liquid carry over whenever the gas flow through the U-tube 11 was commenced. Furthermore, it has been found it required at least about 85% of maximum flow of the gas through the U-tube 11 in order to have sufficient pressure reduction at the throat 28 to hold the liquid draw-down and keep a dry flow of gas. These problems are overcome by the instant invention which makes use of modified structure for the U-tube arrangement, as well as some additional elements, to accomplish the desired result.

Figure 2:
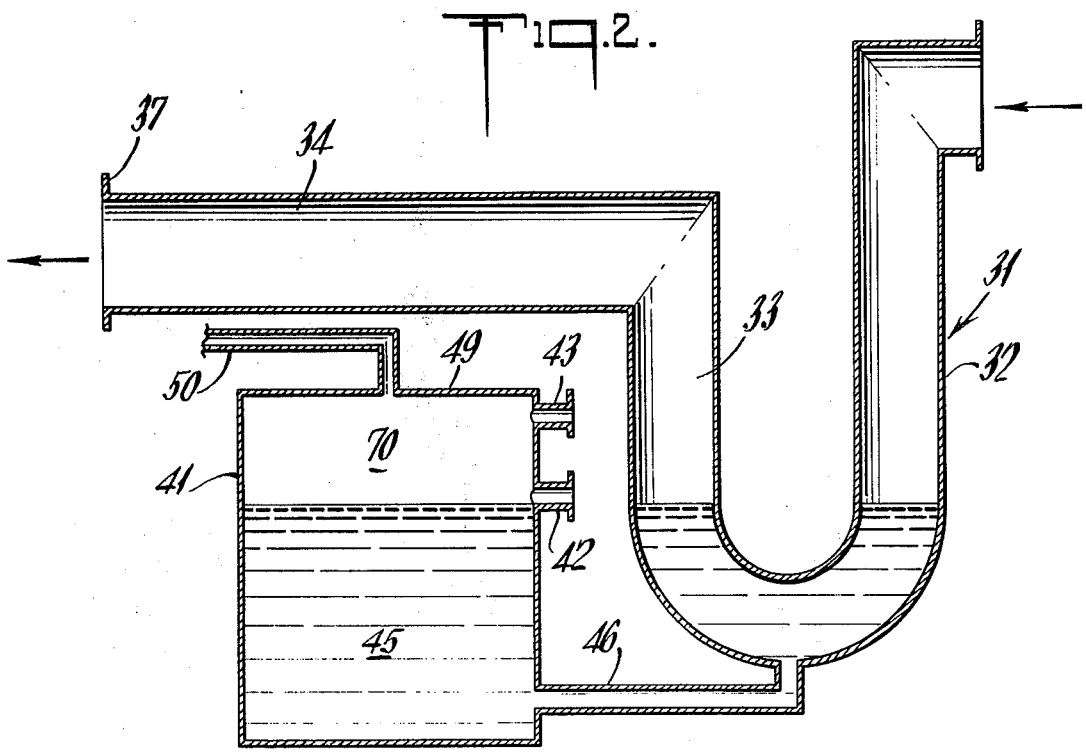
FIG. 2 is similar schematic diagram of the basic elements of the invention but with the changes that are applicable to the invention.

Referring to FIG. 2 it will be noted that this invention makes use of elements that are like those of the prior art structure illustrated in FIG. 1, but not all of such elements are the same and the operation is quite different. Thus, this invention employs a U-tube shaped conduit 31 that includes an inlet leg 32 and an outlet leg 33 with a full diameter conduit 34 connected to the output side thereof. The conduit 34 has a flange 37 for making a gas-tight connection with the inlet of a gas line 38 (see FIG. 3), to which the inert gas of a gas inerting system will be delivered.

As indicated in FIG. 2, the invention also includes a reservoir 41 that has an overflow connector 42 as well as a liquid makeup connection 43. A body of liquid 45 is contained in the reservoir 41. Also, by reason a liquid passage connection 46 that joins the bottom of the U-shaped conduit 31 to the reservoir 41 (near the bottom thereof), the body of liquid 45 will stand (under static conditions) at the same height in the bottom of the U-shaped conduit 31, as the overflow connection 42 in the reservoir 41.

In addition, as was the case with the prior art, the reservoir 41 has a closed top 49. But, in this instance there is a pneumatic passage or connection 50, that leads to a two position three-way valve means 51 which is schematically indicated in FIG. 3. The remainder of the system is illustrated schematically in FIG. 3, where it will be observed that the combined U-shaped conduit and reservoir is illustrated schematically as a single unit which may be called a deck seal 55. The system also includes a diaphragm type actuator 56 which has a spring bias means 57 incorporated therewith.

It may be noted here that the diaphragm actuator 56 might take many different and various forms. This type of instrument is well known and commercially available in various sizes shapes and configurations. Similarly, the spring bias means 57 may be incorporated as part of the actuator 56, or it may be applied externally or otherwise designed to act in the manner desired to bias the actuator into one of its two positions.

The three-way valve 51 is schematically illustrated in the one position which it will take when the bias means or spring 57 is effective, i.e., in the absence of pressure differential on the diaphragm to override the spring bias force. The valve 51 has three ports 61, 62 and 63 which are arranged so that the internal connection of the valve will be rotated into either of two positions. Consequently, the port 62 will be connected to the port 61 or the port 63 in the alternative. This is carried out by mechanical interconnections 66 and 67 that are schematically indicated. They are arranged so that the diaphragm actuator 56 will position the valve 51 in either of the two positions just indicated above. In other words, the valve 51 will be in the illustrated position for connecting the port 62 with the port 61. Or, it will be in the other position after rotating the internal connections by 90° so that the port 62 will be connected with the port 63.

With reference to FIG. 2 as well as FIG. 3 there is a first pneumatic conduit means which is made up of the pneumatic passage 50 that connects at one end with an ullage space 70 in the top of the reservoir 41, and at the other end with the port 62 of the three-way valve 51. A second pneumatic conduit means 71 connects the port 61 of the three-way valve, to the gas line 38 via another pneumatic connection 72. There is also a pneumatic connection 73 that joins the connections 71 and 72 together and connects them to one side of the diaphragm actuator 56.

A third pneumatic conduit means includes a pneumatic connection 76 that connects the port 63 of the valve 51 to the suction side of a pair of pneumatic pumps, or fans 77. This connection is completed from connector 76 via a plurality of pneumatic connections 78, 79 and 80.

The outside sides of the pumps 77 go via pneumatic connections 82, 83 and 84 to the inlet leg of the pneumatic deck seal 55. There is also a pneumatic connection 87 that joins the connection 84. This pneumatic line 87 goes to one side of the diaphragm actuator 56.

It will be understood that the system illustrated by FIG. 3 is one that is particularly for use on a tank ship. Consequently, the source of inert gas that is to be applied to the gas line 38, is a scrubber 88 that is schematically indicated. Scrubber 88 removes undesired solids and other constituents of the stack exhaust gas. From the scrubber, there is an inert gas flow path over a connection 89 to the pneumatic connections 76 and 78 of the system already described.

The FIG. 3 system operates as follows. When it is desired to apply inert gas to a gas line, e.g., line 38, that leads to a petroleum product (not shown) for inerting the space above the product, there will be a start up of the pumps or fans 77. These apply pneumatic pressure via the outlet connections 82 and 83, as well as connections 84 and 87, to one side of the diaphragm actuator 56. Such start up pressure will not be enough to force any of the liquid in the deck seal 55 out of the U-shaped conduit therein, but it will actuate the diaphragm actuator 56 against the bias of the spring 57 and cause the three-way valve 51 to be shifted over from the illustrated (spring bias) position to the other position so that the port 63 will be connected to the port 62. Consequently, the ullage space in the seal 55 will be connected via the pneumatic line or connection 50 and through the valve 51 via the port 63 to pneumatic connection 76 which leads back to the suction side of the pumps 77 (via connections 78, 79 and 80). Therefor, the suction or reduced pressure will be connected to the ullage space 70 (see FIG. 2) of the reservoir 41 and this will draw off liquid 45 out through the over flow 42 and so reduce the level of the liquid in the bottom of the U-shaped conduit 31. By proper design, this will draw down the liquid fast enough to avoid the carry over of liquid which might otherwise tend to be created as the inert gas flow is applied to the inlet leg 32 (FIG. 2) of the seal 55 (FIG. 3).

Then whenever the pumps 77 are stopped and the pressure difference is no longer applied to the diaphragm actuator 56, it will move back because of the spring bias 57, and the deck seal 55 will be refilled with liquid as illustrated, so that it will be effective to prevent any back flow of gas through the U-shaped conduit of the deck seal unit.

FIG. 4 illustrates a modification for part of the system just described above in relation to FIG. 3. Consequently, the same elements will have the same reference numbers with a prime mark added thereto. In this case, instead of employing a single diaphragm actuator 56 as in FIG. 3, there are a pair of diaphragm actuators 91 and 92. These are connected mechanically in series, so that the pneumatic systems are separated. This means that should a hole, or rupture, develop in either of the diaphragms of actuators 91 or 92 it would not provide a direct passage for flow of gases from the gas line input 38' (cargo tank connection) back to the inert gas source which includes the dangerous high temperatures, etc.

Since the remaining elements of the FIG. 4 modification are identical with the corresponding elements of FIG. 3, no further explanation thereof is deemed necessary.

In regard to FIG. 5, there is another modification which is one that provides for improved sensitivity over the system according to the FIG. 3 system. Thus, there is a pneumatic deck seal 55'' that is connected into the system so as to act in basically the same manner as the seal 55 of FIG. 3. The inlet leg of the seal 55'' is connected to an input gas flow line 84'' and the output leg is connected to the inert gas line 38'' which is similar to the corresponding gas line 38 of FIG. 3. Also, there is a pneumatic flow line connection 50'' from the ullage space of the seal 55'' to the port 62'' of the three-way valve 51''. In this modification, the sensitivity is gained by having a servo system so that there is a diaphragm actuator 96 that has the two sides of the diaphragm connected to the inlet and outlet legs of the deck seal 55''. However, in this case its mechanical connection from the diaphragm goes to a slide valve, or servo valve 97. This servo valve 97 acts to connect a source of greater pneumatic pressure (indicated by an arrow 100) to either of two pneumatic flow lines 101 or 102. These lines are connected to the opposite sides of the diaphragm of another actuator 105 that has a spring bias means 106 for holding it in the safe position under shut down or static conditions. This action is the same as was the case in the other modifications. It will be understood that this modification acts basically the same way as the FIG. 3 system, but it includes a servo power boost so that the sensitivity of the operation may be improved.

While the invention has been described above in considerable detail in accordance with the applicable statutes, this is not to be taken in any way limiting the invention but merely as being descriptive thereof.

I claim:

1. A liquid seal for preventing back flow in a gas line having a pump associated therewith for circulating said gas, comprising in combination
   a U-shaped conduit adapted for connection to the inlet of said gas line,
   a reservoir for holding a supply of said sealing liquid and having an overflow located at a predetermined level above the bottom of said U-shaped conduit, and
   a liquid flow passage connecting the bottom of said U-shaped conduit with said reservoir,
   said reservoir having a closed top with means for connecting the ullage space to a valve means for alternatively connecting said ullage space to the inlet of said gas line or to suction of said circulating pump.

2. A liquid seal according to claim 1, wherein
   said means for connecting the ullage space, comprises
   a three-way valve having three ports,
   first pneumatic conduit means for connecting said ullage space to one of said ports,
   second pneumatic conduit means for connecting another of said ports to said inlet of said gas line, and
   third pneumatic conduit means for connecting the third one of said ports to the suction side of said pump.

3. A liquid seal according to claim 2, wherein said means for connecting the ullage space, also comprises
   means actuated by pneumatic pressure differential between the outlet of said pump and the inlet of said gas line to shift said three-way valve from one position for connecting said ullage space to the inlet of said gas line to another position for connecting said ullage space to the suction side of said pump.

4. A liquid seal according to claim 3, wherein
   said means actuated by pneumatic pressure differential, comprises
   a pneumatic motor for actuating said three-way valve.

5. A liquid seal according to claim 4, wherein
   said pneumatic motor comprises
   a diaphragm type actuator having spring bias means for biasing said three-way valve into the position for connecting said ullage space to the inlet of said gas line.

6. A liquid seal according to claim 5, wherein
   said diaphragm type actuator comprises
   a pair of diaphragms mechanically interconnected but pneumatically isolated to prevent a ruptured diaphragm from permitting a pneumatic connection between said gas line inlet and said pump outlet.

7. A liquid seal according to claim 5, further comprising
   a second more sensitive diaphragm type actuator,
   a servo valve actuated by said second actuator,
   means for connecting a source of pneumatic pressure to said servo valve for alternative connection to one of two outputs, and
   fourth and fifth pneumatic circuit means for connecting said two outputs to said first diaphragm type actuator.

8. A liquid seal for preventing back flow in a low pressure gas line having a pump associated therewith for circulating said gas, comprising in combination
   a U-shaped conduit having an inlet leg and an outlet leg adapted for connection to the inlet of said gas line,
   said inlet leg having a height that is sufficient to create a safe sealing liquid back pressure against said gas back flow,
   a reservoir for holding a supply of said sealing liquid and having an overflow located at a predetermined level above the bottom of said U-shaped conduit,
   a liquid flow passage connecting the bottom of said U-shaped conduit with said reservoir,
   said reservoir having a closed top forming an ullage space above said liquid in said reservoir,
   two position three-way valve means having three ports,
   first pneumatic conduit means for connecting said ullage space to one of said ports,
   second pneumatic conduit means for connecting another of said ports to said gas line inlet,
   third pneumatic conduit means for connecting the third one of said ports to the suction side of said pump,
   spring bias means for biasing said two position valve into the position for connecting said ullage space to said gas line inlet.

9. A liquid seal for use on petroleum product tankers and the like having a blower for filling empty cargo tank space with an inert gas, said liquid seal comprising in combination
   a U-shaped conduit having an inlet leg tall enough to ensure adequate back pressure sealing against reverse flow from said cargo tank space,
   a closed reservoir for holding a supply of said liquid and having an overflow located at a predetermined level above the bottom of said U-shaped conduit,
   a liquid flow passage connecting the bottom of said U-shaped conduit with said reservoir,
   pneumatically actuated valve means for alternatively connecting the top of said closed reservoir to said inlet leg or to the suction side of said blower,
   means for actuating said valve means by pressure from the output side of said blower, and
   means for biasing said valve means to connect said reservoir top to said inlet leg in the absence of said blower pressure.

10. A liquid seal according to claim 9, wherein
    said pneumatically actuated valve means comprises
    a two position three-way valve, and
    said valve actuated means comprises
    a diaphragm type actuator having one side of the diaphragm connected to the output side of said blower and the other side connected to said cargo tank space.

11. A liquid seal according to claim 10, wherein
    said diaphragm type actuator comprises a pair of diaphragms mechancially interconnected but pneumatically isolated to prevent a ruptured diaphragm from permitting a pneumatic connection between said output side of said blower and said cargo tank space.

* * * * *